United States Patent [19]

Ishida et al.

[11] 4,084,862
[45] Apr. 18, 1978

[54] THRUST SUPPORT SYSTEM FOR VERTICAL SHAFT ROTARY MACHINE

[75] Inventors: Isao Ishida, Takahagi; Hiroshi Sato; Sho Kusumoto, both of Hitachi, all of Japan

[73] Assignee: Hitachi, Ltd., Japan

[21] Appl. No.: 716,223

[22] Filed: Aug. 20, 1976

[30] Foreign Application Priority Data

Sep. 11, 1975 Japan .............................. 50-110376

[51] Int. Cl.² ............................................. F16C 3/00
[52] U.S. Cl. ................................ 308/139; 308/134.1; 308/157; 308/160
[58] Field of Search ...................... 308/6, 8, 160, 163, 308/134.1, 139, 140, 157

[56] References Cited

U.S. PATENT DOCUMENTS

| | | | |
|---|---|---|---|
| 2,574,798 | 11/1951 | Rasmussen | 308/157 |
| 2,701,171 | 2/1955 | Henter | 308/160 |
| 2,703,736 | 3/1955 | Cart | 308/140 |

*Primary Examiner*—Richard A. Bertsch
*Attorney, Agent, or Firm*—Craig & Antonelli

[57] ABSTRACT

The present invention is concerned with a thrust support system supporting on a stand the thrust of a rotator of a vertical shaft rotary machine. Said support system comprises a ring-like member for receiving thrust of the rotator, legs disposed at a given distance from and obliquely upwardly of said member, and slanted connecting members for connecting said ring-like member with the legs, and said legs being provided with a movement-preventing member for preventing the legs from moving in the diametral direction.

With this arrangement, stresses acting on said respective members are distributed in simple and uniform manner.

7 Claims, 9 Drawing Figures

THRUST SUPPORT SYSTEM FOR VERTICAL SHAFT ROTARY MACHINE

BACKGROUND OF THE INVENTION

This invention relates to a thrust support system for a vertical shaft rotary machine such as a vertical shaft hydraulic turbine generator or a vertical shaft pump, more particularly to a thrust support system for finally supporting on a stand the thrust of a rotator of a large machine.

In a large vertical shaft rotary machine, the weight of the rotator is large and hence load transmitted to the stand is greatly increased. For example, in a water turbine generator, a thrust bearing supports not only the rotator of the generator but also the weight of the rotary section of the turbine and hydraulic thrust of turbine. Hence, a load as large as several thousand tons should be frequently transmitted to the stand.

For this reason, the thrust support system for transmitting load to the stand is needed to be strong.

The thrust support system which has heretofore been adopted in general, as disclosed in U.S. Pat. No. 2,701,171 for example, has a bearing oil tank, provided at the center portion thereof with a throughhole for receiving a rotary shaft, and a plurality of spider arms extending horizontally and radially from said oil tank. The tail end of said arm is mounted on the stand, to thereby support the rotator. In general, said spider arm is of letter 'I' shape in section. In many cases, the thrust of the rotator is controlled by bending strength of said spider arm and strength of the oil tank in displacement of the diametral direction.

However, in the case where the decrease in weight or improvement in strength is sought in designing a structure of machine, it is desirable to design the structure in which the members constituting the structure each carry uniform stress.

Additionally, it is desirable that the stresses generated in the members are in the conditions of simple tension stress or compressive stress as possible. The use of the members in the conditions of shearing stress is not advantageous because shearing modulus of elasticity is by far less than compression modulus of elasticity.

From the viewpoint described above, construction of the support system, i.e., bracket of the prior art has been such that load is supported by bending strength and shearing strength of spider arms and hence utilization rate of the material is low, and it is not expectable to considerably decrease the weight unless allowable stress is increased to an extreme extent. Since the increase in allowable stress results in the decrease in rigidity accordingly, distortion and vibration are increased, thereby possibly presenting new problems.

Further, the spider arm is of letter 'I' shape in section, and constructed by being welded substantially on all the periphery. However, it has been extremely troublesome to carry out such a welding work and inspection in a narrow space within the stand.

SUMMARY OF THE INVENTION

In view of the above, the present invention has been invented, and one object of the invention is to provide a thrust support system for a vertical shaft rotary machine which is of economical and simplified construction, light weight and high in strength and rigidity.

According to the present invention there is provided a thrust support system for a vertical shaft rotary machine, comprising a bearing oil tank adapted to be disposed around the vertical shaft of said vertical shaft rotary machine, a stand provided around said bearing oil tank, and means for supporting said bearing oil tank on said stand, said supporting means including a lower ring member connected to the bottom portion of said bearing oil tank, legs on said stand, at least one connecting member extending obliquely upwardly from said lower ring member and connecting said lower ring member to said legs, and a member for preventing said legs from being radially displaced.

With such an arrangement, all of the members constituting said support system each carry a substantially uniform stress, and the stress will be consist of only a simple stress such as tension or compression stress.

DESCRIPTION OF THE PREFERRED EMBODIMENTS

Detailed Description will hereunder be given of the embodiments with reference to the accompanied drawings.

Figure 1:
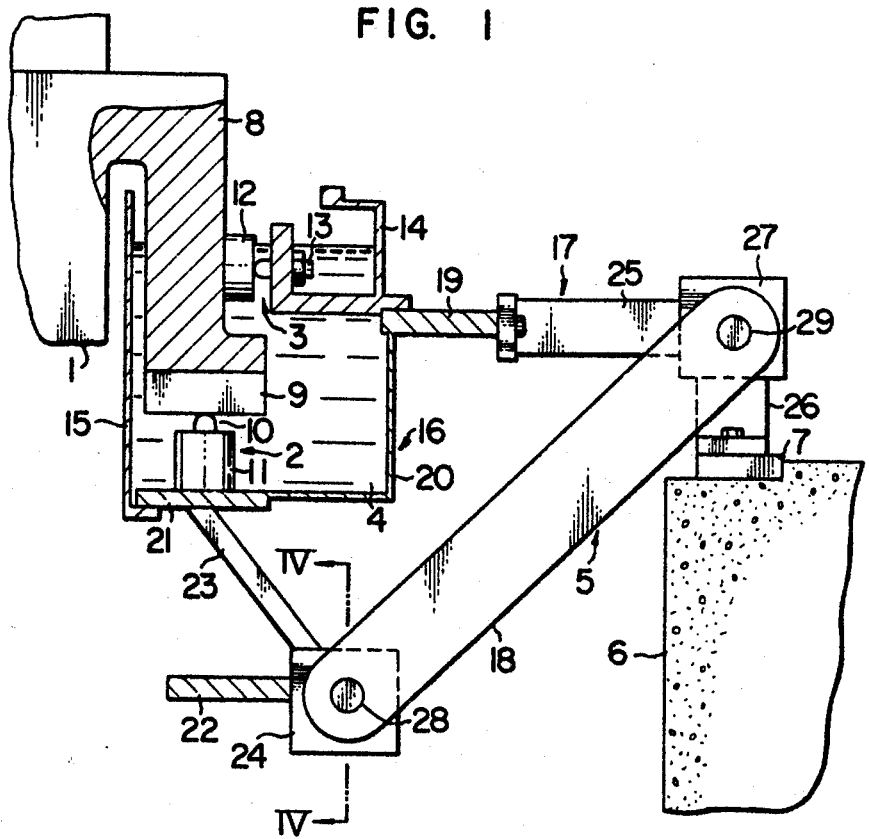
FIG. 1 is a longitudinal side view of the thrust support system embodying the present invention.

FIG. 1 shows a thrust support system for a hydraulic turbine generator or the like in which designated at 1 is a rotary shaft, 2 a thrust bearing means, 3 a guide bearing means, 4 an oil tank, 5 a thrust support system, 6 a stand and 7 a base. The rotary shaft 1 is integrally provided thereon with a collar 8 whose lower end constitutes a sliding portion for a thrust bearing. The thurst bearing means 2 comprises a thrust bearing 9, a pivot 10 and a frame 11. The guide bearing means 3 comprises a guide bearing 2 and an adjusting bolt 13. The oil tank 4 housing the thrust bearing means 2 and the guide bearing 3 comprises a frame 14, an oil dam 15 and a bracket boss 16 additionally serving as part of the thrust support system 5. The oil tank 5 is filled with lubrication oil and provided therein with a cooler (not shown) and the like for cooling said lubrication oil.

Figure 2:
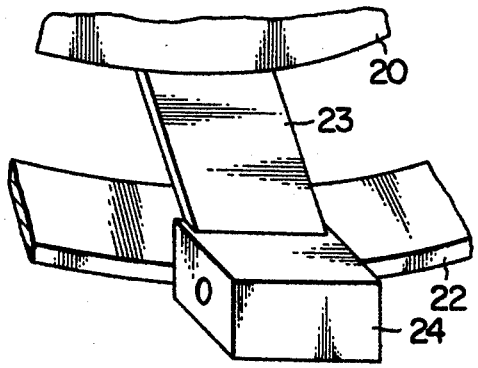
FIG. 2 is a perspective view showing those around the lower portion of the bearing oil tank.

The thrust support system 5 comprises a bracket boss 16, a bracket arm or leg 17 and connecting plates 18. Said bracket boss 16 comprises, as shown in FIG. 1 and FIG. 2, an upper ring 19, a side plate 20 and a bottom plate 21 jointly forming part of the oil tank 4, a stay 23 for connecting said bottom plate 21 to a lower ring 22 and a boss 24 for connecting the lower ring 22 to the connecting plates 18.

Figure 3:
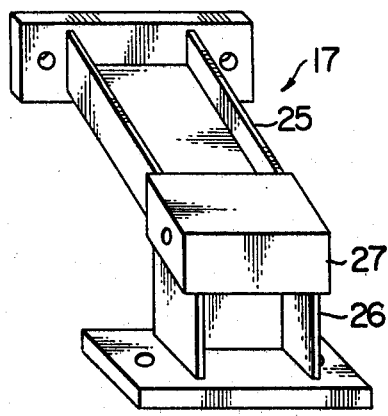
FIG. 3 is a perspective view showing the spider arm.
Figure 4:
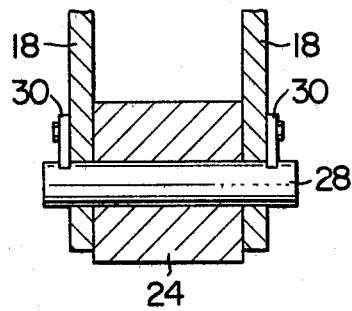
FIG. 4 is a cross-sectional view taken along the line IV—IV in FIG. 1.

As shown in FIG. 1 and FIG. 3, said bracket arm or leg 17 comprises a horizontal main board 25 horizontally and radially extending from the upper ring 19, a vertical main board 26 vertically extending from the base 7 and a boss 27 for connecting said members 25, 26 and the connecting plates 18 to each other. As shown in FIG. 1 and FIG. 4, the connecting board 18 is pivotably coupled to the boss 24 fixed on the lower ring 22 of the bracket boss 16 through a pin 28 and to the boss 27 of the bracket arm 17 through a pin 29, respectively, and stoppers 30 mounted on the connecting plates 18 are engaged with the opposite end portions of said pins 28, 29 to prevent said pins 28, 29 from coming out.

Next, if consideration is given to the transmission of load in the thrust support system 5 constructed as above, then loads acting on the respective connecting points are resoluted into component forces which are parallel with the members, horizontal or vertical, or composited by said component forces, because the bosses 27, 24 disposed at the top and the bottom and the bottom plate 21 of the bracket boss 16 constitute the connecting points in the course through which the thrust bearing load is transmitted. Therefore, all of the external forces acting on the respective members turn into simple tension or compressive forces, and further, the respective members each carry a component force in any direction without fail. Hence, the component forces generated inside of the respective members are made uniform and the materials constituting the respective members can be utilized economically. In passing, if detailed description is given of the component forces of the respective members, the stay 23 carries the compressive force, the connecting plates 18 tension force and the horizontal main board 25 and the vertical main board 26 compressive forces, respectively.

Further, since the conventional member of I shape in section and disposed radially and horizontally is not used as the member constituting the thrust support system, welding portions are decreased in number and the welding work and the inspections accompanied therewith can be facilitated.

Figure 5:
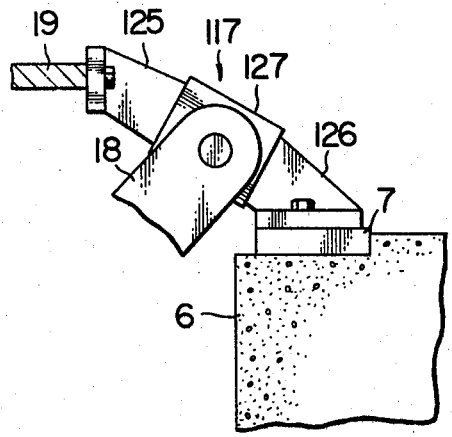
FIG. 5 through FIG. 7 are longitudinal side views showing the essential portions of modifications of the present invention which are different from one another.
Figure 6:
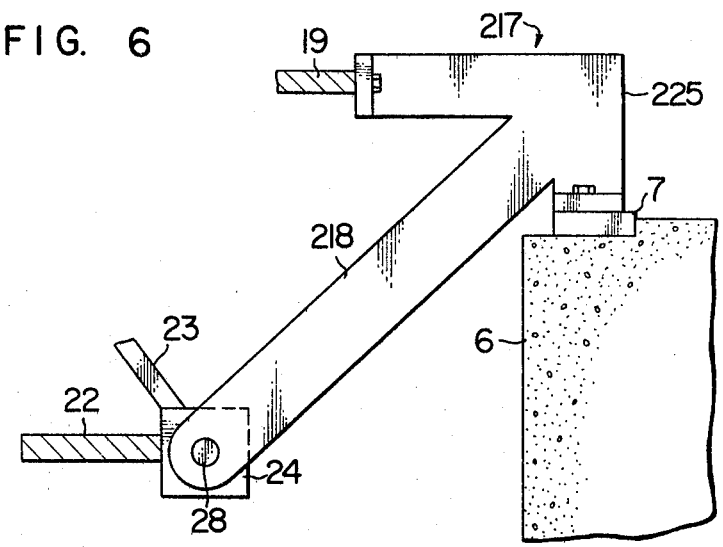
Figure 7:
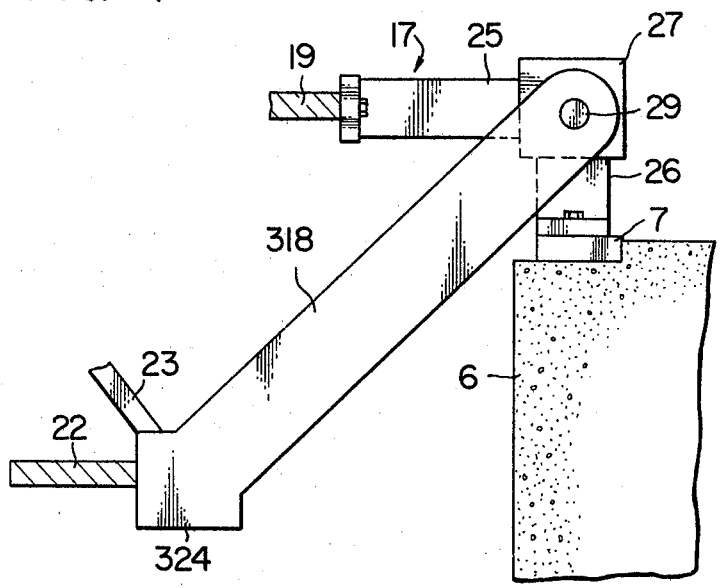

FIG. 5 through FIG. 7 show modifications of the embodiment shown in FIGS. 1 to 4 of the present invention, respectively. In FIG. 5 a leg 117 comprises a main board 125 extending radially, outwardly, obliquely downwardly of the upper ring 19, a main board 126 extending radially, inwardly, obliquely upwardly of the base 7, and a boss 127 for connecting said members and the connecting plates 18 to each other. In FIG. 6, an angle member 225 is used in which an arm 217 is integrally formed with connecting plates 218. In FIG. 7, a lower boss 324 is integrally formed with connecting plates 318.

Figure 8:
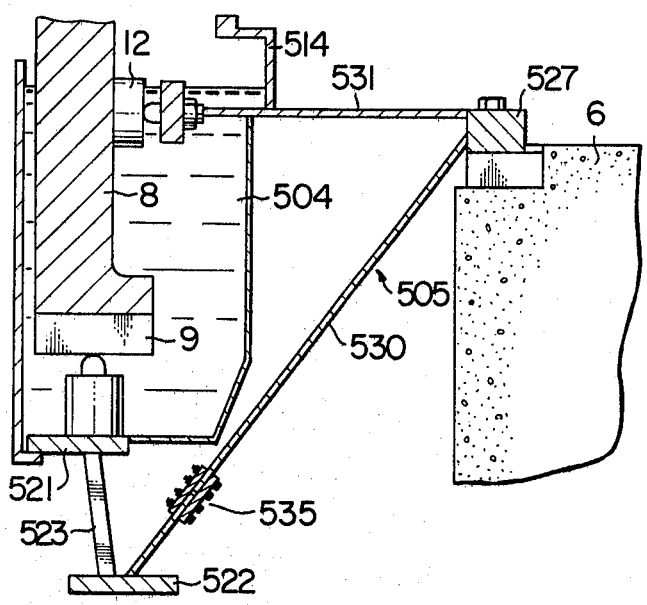
FIG. 8 and FIG. 9 are longitudinal side views, partly sectional, showing other embodiments of the present invention.

FIG. 8 shows another embodiment. Same reference numerals as shown in FIG. 1 are used in FIG. 8 to designate same parts or members. A thrust support device 505 comprises a horizontal disc 531 and a frusto-conical member 530. The horizontal disc 531 is brought into contact at one end thereof with the collar 8 through the guide bearing 12 for preventing the rotary shaft from transverse oscillation, solidly secured at the other end thereof to a leg forming boss 527. On the other hand, the frusto-conical member 530 is solidly secured at one end thereof to a lower ring 522 below the bottom portion of an oil tank 504, and fixed at the other end thereof on the boss 527 similarly to the horizontal disc 531. In addition, designated at 523 are a plurality of stays for connecting a bottom plate 521 of the oil tank to the lower ring 522. Joint means 535 may be provided, if the frusto-conical member cannot be integrally formed due to the limitations for transportation. The joint means 535 makes it possible to disassemble the frusto-conical member. Needless to say, the joint means is not required, if there is no limitation for transportation.

With the thrust support system 505 including the frusto-conical member as above, the transmission of loads is effected as follows. Namely, the frusto-conical member 530 receives downward tension load uniformly along the periphery thereof below the oil tank 504, and transmits the load to the stand 6. Further, the horizontal disc 531 directly transmits to the stand 6 the load caused by transverse vibration of the collar 8 integrally formed on the rotary shaft, the load being a compressive load in this case.

With the thrust support system of the arrangement described, the members are greatly decreased in number, the construction is simplified and the frusto-conical member transmits the load in tension stress of one direction and hence calculations on stresses and distortions can be easily carried out. In addition, since said thrust support system is symmetric with respect to the axis of the shaft, stresses uniformly act on the respective members constituting the thrust support system so that the utilization rates of the materials can be extremely satisfactory and the component members can be lessened in thickness.

Figure 9:
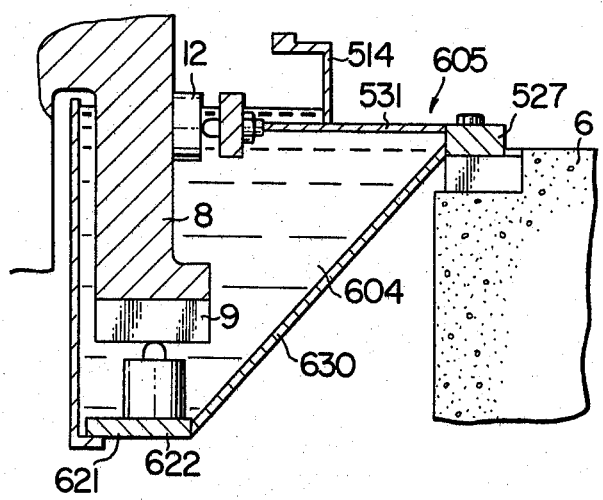

FIG. 9 shows a modification in the case of utilizing a frusto-conical member, which differs from the embodiment shown in FIG. 8 in that one of the side walls of an oil tank 604 is formed by a frusto-conical member 630 constituting a thrust support system 605 and the bottom plate 621 of the oil tank is formed by a lower ring 622.

With such a modification, since one of the side walls is formed by the frusto-conical member, the members can be further decreased in number and the weight can be also decreased.

Although there is not shown in FIG. 9, it is possible to provide an adjusting frusto-conical or cylindrical member within the frusto-conical member 630 to keep the necessary amount of lubricating oil therein. Further, it does not necessarily follow that the frusto-conical member should be perfectly conical, but may be formed into a polygonal in section.

As has been described above, according to the present invention, the stresses carried by the respective members can be made uniform and hence the materials can be economically utilized. In addition, since the construction is simplified and the welding portions are decreased in number, the thrust support system can be greatly decreased in weight and manufacturing cost can be reduced. In passing, such a result has been achieved that a hydraulic turbine generator of 300 MVA was reduced in weight by 25%.

What is claimed is:

1. A thrust support system for a vertical shaft rotary machine, comprising a bearing oil tank adapted to be disposed around the vertical shaft of said vertical shaft rotary machine; a stand provided around said bearing oil tank; and means for supporting said oil bearing tank on said stand; said supporting means including: a lower ring member connected to the bottom portion of said bearing oil tank; legs mounted on said stand; a plurality of connecting members extending obliquely upwardly of said ring member and connecting said ring member to said legs; and a member for preventing said leg of the stand from moving in the diametral direction.

2. A thrust support system for a vertical shaft rotary machine as set forth in claim 1, wherein the preventing member is an annular member.

3. A thrust support system for a vertical shaft rotary machine as set forth in claim 2, further comprising guide bearing means journally supporting the peripheral surface of said vertical shaft and guiding the movement of said vertical shaft in the radial direction, said annular member being disposed around the outer peripheray of said guide bearing means.

4. A thrust support system for a vertical shaft rotary machine as set forth in claim 1, wherein said lower ring member is connected to the bottom portion of said bearing oil tank through a plurality of stays.

5. A thrust support system for a vertical shaft rotary machine, comprising a bearing oil tank adapted to be disposed around the vertical shaft of said vertical shaft rotary machine; a stand provided around said bearing oil tank; and means for supporting said bearing oil tank on said stand; said supporting means including: a lower ring member connected to the bottom portion of said bearing oil tank; legs mounted on said stand; a frusto-conical member having its diameter increased upwardly, connecting said legs to said lower ring and placed in concentric relation to said vertical shaft; and a member for preventing said leg of the stand from moving in the diametral direction.

6. A thrust support system for a vertical shaft rotary machine as set forth in claim 5, wherein said frusto-conical member forms part of side walls of said bearing oil tank.

7. A thrust support system for a vertical shaft rotary machine as set forth in claim 5, wherein said lower ring member is connected to the bottom portion of said bearing oil tank through a plurality of stays.

* * * * *